United States Patent
Ogura et al.

(10) Patent No.: US 12,110,401 B2
(45) Date of Patent: Oct. 8, 2024

(54) AQUEOUS INK COMPOSITION FOR WRITING INSTRUMENT

(71) Applicant: MITSUBISHI PENCIL COMPANY, LIMITED, Tokyo (JP)

(72) Inventors: Kousuke Ogura, Tokyo (JP); Akiko Hirayama, Tokyo (JP); Kana Miyoshi, Tokyo (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 1093 days.

(21) Appl. No.: 16/965,529

(22) PCT Filed: Jan. 21, 2019

(86) PCT No.: PCT/JP2019/001623
§ 371 (c)(1),
(2) Date: Jul. 28, 2020

(87) PCT Pub. No.: WO2019/146539
PCT Pub. Date: Aug. 1, 2019

(65) Prior Publication Data
US 2021/0047529 A1    Feb. 18, 2021

(30) Foreign Application Priority Data

Jan. 29, 2018 (JP) ................................ 2018-012759

(51) Int. Cl.
| | | |
|---|---|---|
| C09D 11/17 | (2014.01) | |
| B01J 13/02 | (2006.01) | |
| C09D 11/18 | (2006.01) | |
| C09D 17/00 | (2006.01) | |

(52) U.S. Cl.
CPC ............... *C09D 11/17* (2013.01); *B01J 13/02* (2013.01); *C09D 11/18* (2013.01); *C09D 17/00* (2013.01); *C09D 17/001* (2013.01); *C09D 17/005* (2013.01); *C09D 17/007* (2013.01)

(58) Field of Classification Search
CPC ........ B01J 13/02; C09D 11/17; C09D 17/001; C09D 17/005; C09D 17/007; C09D 11/18; C09D 17/00
See application file for complete search history.

(56) References Cited

U.S. PATENT DOCUMENTS

| | | | |
|---|---|---|---|
| 4,157,983 A | 6/1979 | Golden | |
| 6,890,653 B2 | 5/2005 | Wulff et al. | |
| 11,015,076 B2 | 5/2021 | Nakashima et al. | |
| 2004/0040681 A1* | 3/2004 | Ohashi | D21H 21/22 162/158 |
| 2004/0232575 A1 | 11/2004 | Wulff et al. | |
| 2017/0088737 A1 | 3/2017 | Nakashima et al. | |
| 2017/0100357 A1* | 4/2017 | Folan | A61Q 11/00 |
| 2019/0010344 A1* | 1/2019 | Ichikawa | C09C 3/10 |

FOREIGN PATENT DOCUMENTS

| | | | |
|---|---|---|---|
| CN | 1541138 A | | 10/2004 |
| CN | 104893425 A | | 9/2015 |
| CN | 105440795 A | | 3/2016 |
| CN | 106459637 A | | 2/2017 |
| EP | 0787779 A2 | | 8/1997 |
| JP | H05171095 A | | 7/1993 |
| JP | 2000265105 A | | 9/2000 |
| JP | 2003105246 A | | 4/2003 |
| JP | 2006111761 A | | 4/2006 |
| JP | 2010196035 A | | 9/2010 |
| JP | 2013-032454 | * | 2/2013 |
| JP | 2014122269 A | | 7/2014 |
| JP | 2017122167 A | | 7/2017 |
| JP | 2017122168 A | | 7/2017 |
| WO | WO 2015/163421 | * | 10/2015 |
| WO | WO 2017/119480 | * | 7/2017 |

OTHER PUBLICATIONS

Machine English translation of JP 2006-111761, Sato, Apr. 2006.*
https://www.cosmeticsandtoiletries.com/cosmetic-ingredients/moisturizing/article/21834596/comparatively-speaking-linear-vs-branched-vs-unsaturated-alcohols-and-acids.*
Author unknown, Chemspider Bulletin for 1,4-Bis (β-hydroxyyethoxy)benzene, copyright 2023.*
Machine English translation of JP 2013-032454, Iwasa et al., Feb. 14, 2013.*
Extended European Search Report issued on Sep. 13, 2021, by the European Patent Office in corresponding European Application No. 19743358.4-1102, (6 pages).
International Search Report (PCT/ISA/210) mailed on Feb. 26, 2019, by the Japanese Patent Office as the International Searching Authority for International Application No. PCT/JP2019/001623.
Written Opinion (PCT/ISA/237) mailed on Feb. 26, 2019, by the Japanese Patent Office as the International Searching Authority for International Application No. PCT/JP2019/001623.

* cited by examiner

*Primary Examiner* — Patrick D Niland
(74) *Attorney, Agent, or Firm* — BUCHANAN, INGERSOLL & ROONEY PC

(57) ABSTRACT

Provided is an aqueous ink composition for a writing instrument with excellent stability of ink flow and the like, in which aggregation of a microcapsule pigment and clogging due to such aggregation are suppressed. The aqueous ink composition for a writing instrument includes a microcapsule pigment which includes inside, at least, a pigment and a medium of a fatty acid polyol ester. A melting point of the fatty acid polyol ester is preferably 40° C. or higher, and is preferably 70° C. or lower.

5 Claims, No Drawings

AQUEOUS INK COMPOSITION FOR WRITING INSTRUMENT

TECHNICAL FIELD

The present invention relates to an aqueous ink composition for a writing instrument using a microcapsule pigment which includes inside a pigment with a high specific gravity such as titanium oxide or a pigment with a somewhat poor dispersibility such as carbon black.

BACKGROUND ART

There are known aqueous ink compositions for a writing instrument (for example, Patent Documents 1 to 3) using a microcapsule pigment formed by microencapsulating a pigment with a high specific gravity such as titanium oxide or a pigment with a somewhat poor dispersibility such as carbon black in order to improve the dispersibility and the like.

However, when these aqueous ink compositions for a writing instrument using a microcapsule pigment are used in a ballpoint pen or the like, the microcapsule pigment aggregates around the ball and clogging due to further accumulation of aggregation occurs. Thus, the flow stability of the ink is disadvantageously impaired.

On the other hand, the present applicant has proposed, as an aqueous ink composition for a writing instrument in which dispersibility of the microcapsule pigment is improved and the specific gravity and the particle diameter are further optionally controllable, an aqueous ink composition for a writing instrument (for example, Patent Document 4) including a microcapsule pigment which contains, at least, a pigment and a poorly water-soluble medium with a specific gravity of less than 1 at 20° C.

However, there is no disclosure of a fatty acid polyol ester in the aqueous ink composition for a writing instrument, and the aqueous ink composition for a writing instrument differs from that of the present invention, for example, in terms of the object and problems of the invention.

CONVENTIONAL ART DOCUMENTS

Patent Documents

Patent Document 1: Japanese Patent Application Laid-Open No. 2000-265105 A (Claims, Examples, and others)
Patent Document 2: Japanese Patent Application Laid-Open No. Hei. 5-171095A (Claims, Examples, and others)
Patent Document 3: Japanese Patent Application Laid-Open No. 2010-196035 A (Claims, Examples, and others)
Patent Document 4: Japanese Patent Application Laid-Open No. 2017-122168 A (Claims, Examples, and others)

SUMMARY OF THE INVENTION

Problems to be Solved by the Invention

In light of the above-mentioned problems and the like of the related art, the present invention is intended to solve the problems, and an object thereof is to provide an aqueous ink composition for a writing instrument, when using a microcapsule pigment formed by microencapsulating a pigment with a high specific gravity such as titanium oxide or a pigment with a somewhat poor dispersibility such as carbon black, in which aggregation of a microcapsule pigment and clogging due to such aggregation are suppressed, providing excellent stability of ink flow and the like.

Means to Solve Problems

As a result of intensive studies in light of the above-mentioned problems and the like, the present inventors have found that, in an aqueous ink composition for a writing instrument, inclusion of a microcapsule pigment which includes inside, at least, a pigment such as titanium oxide or carbon black and a specific component leads to the target aqueous ink composition for a writing instrument described above, and thus has completed the present invention.

The aqueous ink composition for a writing instrument according to the present invention includes a microcapsule pigment which includes inside, at least, a pigment and a fatty acid polyol ester.

A melting point of the fatty acid polyol ester is preferably 40° C. or higher, and is preferably 70° C. or lower.

A shell component forming a microcapsule is preferably urethane, urea, or urea-urethane.

Effects of the Invention

According to the present invention, an aqueous ink composition for a writing instrument with excellent stability of ink flow and the like, in which aggregation of a microcapsule pigment and clogging due to such aggregation are suppressed, is provided.

DESCRIPTION OF EMBODIMENTS

An embodiment of the present invention is described below in detail.

The aqueous ink composition for a writing instrument according to the present invention includes a microcapsule pigment which includes inside, at least, a pigment and a fatty acid polyol ester.

<Microcapsule Pigment>

The type of pigment that can be used is not particularly limited, and any pigment can be used from among inorganic and organic pigments commonly used in aqueous ink compositions for a writing instrument and the like.

Examples of the inorganic pigments include carbon black, titanium oxide, zinc oxide, iron oxide, chromium oxide, and ultramarine.

Examples of the organic pigments include azo lake, insoluble azo pigments, chelate azo pigments, phthalocyanine pigments, perylene and perinone pigments, anthraquinone pigments, quinacridone pigments, lake dyes, nitro pigments, and nitroso pigments.

Preferably, from the viewpoints of microcapsulation facilitating easier dispersion than original material (pigment) and optionally controlling specific gravity and particle diameter, carbon black, phthalocyanine pigments, quinacridone pigments, and pigments with a high specific gravity such as titanium oxide and zinc oxide are desired.

The type of pigment to be used, such as titanium oxide or carbon black, is not particularly limited so long as the pigment is used in inks for a writing instrument, and commercially available products of the pigment, if present, can be used.

<Fatty Acid Polyol Ester>

In the present invention, the fatty acid polyol ester to be used is an ester constituted of a fatty acid and a polyol.

Examples of the fatty acid constituting the fatty acid polyol ester include fatty acids having a linear or branched hydrocarbon group having 6 to 30 carbon atoms, preferably 8 to 24 carbon atoms, particularly preferably 10 to 20 carbon atoms. Note that the alkyl and alkenyl groups in the hydrocarbon group include all possible linear and branched structures, and the double bond in the alkenyl group may be at any position.

Specific examples of such fatty acids include caprylic acid, capric acid, lauric acid, myristic acid, palmitic acid, stearic acid, oleic acid, and behenic acid.

Specific examples of the polyol constituting the polyol ester include ethylene glycol, diethylene glycol, triethylene glycol, polyethylene glycol, propylene glycol, dipropylene glycol, glycerin, sorbitan, sorbitol, pentaerythritol, dipentaerythritol, and trimethylolpropane.

Examples of the fatty acid polyol ester that can be used include (poly) glycerin fatty acid esters, (poly) ethylene glycol fatty acid esters, (poly) propylene glycol fatty acid esters, sorbitan fatty acid esters, polyoxyethylene glycerin fatty acid esters, polyoxyethylene sorbitan fatty acid esters, polyoxyethylene sorbitol fatty acid esters, sorbitol fatty acid esters, pentaerythritol fatty acid esters, and trimethylolpropane fatty acid esters.

Note that the "(poly) glycerin fatty acid ester" means "one or more type(s) selected from the group consisting of glycerin fatty acid esters and polyglycerin fatty acid esters", and the "(poly) ethylene glycol fatty acid ester" and the "(poly) propylene glycol fatty acid ester" are defined in the same manner.

Also, an average molar number (n) of ethylene oxide (EO) added of polyoxyethylene (POE) glycerin fatty acid esters, polyoxyethylene (POE) sorbitan fatty acid esters, polyoxyethylene (POE) sorbitol fatty acid esters, and the like is preferably 5 to 80, more preferably 10 to 60, from the viewpoint of further improvement in effects of the present invention.

Specific compounds include mono-, di-, tri-, tetra-, and higher polyesters of the fatty acids described above, such as (poly) glycerin, sorbitan, (poly) ethylene glycol, (poly) propylene glycol, sorbitol, pentaerythritol, and trimethylolpropane.

Furthermore, the fatty acid polyol ester to be used may be a synthetic product or a natural product, and esters of different types of fatty acids or polyols may be used in combination.

These fatty acid polyol esters can be used alone, or two or more thereof can be used in combination. Preferably, from the viewpoint of stability of ink flow during writing, it is desirable to use a fatty acid polyol ester having a melting point of 40° C. or higher. On the other hand, from the viewpoint of handlability and the like, the melting point of the fatty acid polyol ester used is preferably 70° C. or lower.

Note that, in the present invention (including the Examples which will be described below), the melting point is a temperature of the maximum peak as measured with a differential scanning calorimeter (DSC). For example, the temperature, at which the peak reaches the maximum thereof during melting at temperature rise at 5° C./min, as measured by a differential scanning calorimeter (DSC8230L, manufactured by Rigaku Corporation), may be defined as the melting point.

Examples of commercially available products (trade names) of the fatty acid polyol esters that can be used include RHEODOL MS-50 (glycerin monostearate; melting point: 55 to 65° C.), RHEODOL MO-60 (glycerin monooleate; melting point: 20° C.), RHEODOL SP-P10 (sorbitan monopalmitate; melting point: 46° C.), RHEODOL SP-S30V (sorbitan tristearate; melting point: 54.4° C.), RHEODOL AS-10V (sorbitan monostearate; melting point: 49 to 59° C.); RHEDOL TW-S120V [POE (20) sorbitan monostearate; melting point: 21° C.], RHEODOL TW-S106V [POE (6) sorbitan monostearate; melting point: 38° C.], RHEODOL TW-S320V [POE (20) sorbitan tristearate; melting point: 33° C.], RHEODOL TW-O106V [POE (6) sorbitan monooleate; melting point: 7.5° C.], RHEODOL TW-O320V [POE (20) sorbitan trioleate; melting point: −20° C.], EMANON 1112 (polyethylene glycol monolaurate; melting point: 10 to 13° C.), EMANON 3201M-V (ethylene glycol distearate; melting point: 60 to 65° C.), EMANON 3199V (polyethylene glycol monostearate; melting point: 56.5 to 61.5° C.), EMANON 3299V (polyethylene glycol distearate; melting point: 55 to 58° C.), and EXCEPARL PE-TP (pentaerythritol tetrapalmitate; melting point: 67 to 72° C.) (all manufactured by Kao Corporation); RIKEMAL PP-100 (propylene glycol monopalmitate; melting point: 30 to 36° C.), RIKEMAL PS-100 (melting point propylene glycol monostearate; 42 to 48° C.), and RIKEMAL PB-100 (propylene glycol monobehenate; melting point: 54 to 60° C.) (all manufactured by Riken Vitamin Co., Ltd.); and ESTEPEARL 30 (triethylene glycol distearate; melting point: 44 to 51° C.), and ESTEPEARL 10V (ethylene glycol distearate; melting point: 58 to 65° C.) (all manufactured by Nikko Chemicals Co., Ltd.).

Examples of particularly preferred fatty acid polyol esters include ethylene glycol distearate, triethylene glycol distearate, glycerin monostearate, sorbitan monopalmitate, and propylene glycol monobehenate.

Note that, in the present invention, the effects of the present invention may manifest when a microcapsule pigment constituted by using the fatty acid polyol ester as described above is blended in the ink composition for a writing instrument, and that the effects of the present invention cannot be achieved, for example, when a microcapsule pigment constituted by using a monoprotic alcohol ester other than the exemplified esters, such as myristyl stearate or myristyl myristate, is blended therein (this matter will be further described in detail in the Examples which will be described below).

The microcapsule pigment used in the present invention includes inside, at least, the pigment described above and a medium of the fatty acid polyol ester, and can be produced, for example, by microencapsulating a material which includes inside, at least, the pigment described above and a medium of the fatty acid polyol ester, specifically, enclosing such a material in a shell layer (shell body) which is constituted of a wall film forming material (wall material), so as to achieve a predetermined average particle diameter.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

Preferably, from the viewpoint of ease of production and quality, a shell component forming a microcapsule is preferably a thermosetting resin such as an epoxy resin, urethane, urea, or urea-urethane, and is particularly preferably urethane, urea, or urea-urethane because the microcapsule can include inside large amounts of the components, has little limitation regarding components included therein, and results in excellent redispersibility.

The urethane (polyurethane resin), urea (polyurea resin), and urea-urethane (polyurea resin/polyurethane resin) used in the formation of the shell layer are formed by reacting an isocyanate component with an amine component or an alcohol component. Furthermore, the epoxy resin used in the formation of the shell layer is formed by reacting with a curing agent such as an amine component.

Examples of the isocyanate component that can be used include 2,4-tolylene diisocyanate, 2,6-tolylene diisocyanate, diphenylmethane diisocyanate, polymeric diphenylmethane diisocyanate, hydrogenated diphenylmethane diisocyanate, 1,5-naphthalene diisocyanate, 3,3'-dimethyldiphenyl-4,4'-diisocyanate, hexamethylene diisocyanate, isophorone diisocyanate, m-phenylene diisocyanate, p-phenylene diisocyanate, trans-cyclohexane 1,4-diisocyanate, diphenyl ether diisocyanate, xylylene diisocyanate, hydrogenated xylylene diisocyanate, 2,6-diisocyanate caproic acid, tetramethyl-m-xylylene diisocyanate, tetramethyl-p-xylylene diisocyanate, trimethylhexamethylene diisocyanate, triphenylmethane triisocyanate, tris (isocyanatephenyl) thiophosphate, isocyanate alkyl 2,6-diisocyanate capronate, 1,6,11-undecane triisocyanate, 1,8-diisocyanate-4-isocyanatemethyloctane, 1,3,6-hexamethylene triisocyanate, and bicycloheptane triisocyanate.

Furthermore, examples of the isocyanate component include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4-biphenyl-diisocyanate, 3,3'-dimethylphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, and cyclohexylene-1,4-diisocyanate; triisocyanates such as 4,4',4"-triphenylmethane triisocyanate and toluene-2,4,6-triisocyanate; tetraisocyanates such as 4,4'-dimethyldiphenylmethane-2,2',5,5'-tetraisocyanate; and isocyanate prepolymers such as adducts of hexamethylene diisocyanate and trimethylolpropane, adducts of 2,4-tolylene diisocyanate and trimethylolpropane, adducts of xylylene diisocyanate and trimethylolpropane, and adducts of tolylene diisocyanate and hexanetriol. Such isocyanate components may be used alone or as a mixture.

Specific examples of the amine component that can be used include aliphatic amines such as ethylene diamine, hexamethylene diamine, diaminocyclohexane, piperazine, diethylenetriamine, triethylenetetramine, tetraethylenepentamine, iminobispropylamine, diaminoethyl ether, 1,4-diaminobutane, pentamethylenediamine, 2-methylpiperazine, 2,5-dimethylpiperazine, 2-hydroxytrimethylenediamine, diethylaminopropylamine, diaminopropylamine, diaminopropane, 2-methylpentamethylenediamine, and xylenediamine; and m-phenylenediamine, triaminobenzene, 3,5-tolylenediamine, diaminodiphenylamine, diaminonaphthalene, t-butyltoluenediamine, diethyltoluenediamine, and diaminophenol. Among such amine components, aromatic amines such as phenylenediamine, diaminophenol, and triaminobenzene are preferable.

Specific examples of the alcohol component that can be used include polyols having two or more hydroxyl groups, such as ethylene glycol, 1,3-propanediol, 1,4-butanediol, 1,5-pentanediol, 1,6-hexanediol, glycerin, catechol, resorcinol, and hydroquinone. Such alcohol components may be used alone or as a mixture. Furthermore, the alcohol component and the amine component may be mixed for use.

Concerning the formation of the shell layer from urethane, urea, or urea-urethane, the shell layer can be formed, for example, by 1) interfacial polymerization, for example, in a medium in which a monomer component of at least one of urethane, urea and urethane-urea, and the above-mentioned pigment such as titanium oxide or carbon black and the fatty acid polyol ester are dispersed, or, alternatively, by 2) a production method including an emulsification step of dispersing an oily component (oily phase) containing an isocyanate component in an aqueous solvent (aqueous phase) to prepare an emulsified liquid, and an interfacial polymerization step of adding, to the emulsified liquid, at least one of the amine component and the alcohol component to perform interfacial polymerization.

In the 2) production method, a solvent having a low boiling point can be used in the preparation of the emulsified liquid. A solvent having a boiling point of 100° C. or lower can be used as the solvent having a low boiling point, and examples thereof may include n-pentane, methylene chloride, ethylene chloride, carbon disulfide, acetone, methyl acetate, ethyl acetate, chloroform, methyl alcohol, ethyl alcohol, tetrahydrofuran, n-hexane, carbon tetrachloride, methyl ethyl ketone, benzene, ethyl ether, and petroleum ether. Such solvents may be used alone or as a mixture.

On the other hand, a protective colloid may be included, in advance, in the aqueous phase that is used to emulsify the oily phase. A water-soluble polymer can be used as the protective colloid, and can be appropriately selected from among known anionic polymers, nonionic polymers, and amphoteric polymers. Particularly preferably, polyvinyl alcohol, gelatin, and a cellulose polymer compound are contained.

The aqueous phase may also contain a surfactant. The surfactant can be one appropriately selected from among anionic and nonionic surfactants, which does not act on the protective colloid so as not to cause precipitation or aggregation. Preferred surfactants may include sodium alkylbenzene sulfonate (e.g., sodium lauryl sulfate), dioctyl sodium sulfosuccinate, and polyalkylene glycol (e.g., polyoxyethylene nonylphenyl ether).

The oily phase made in the manner as described above is added to the aqueous phase, and emulsified using mechanical force. Then, the temperature of the system is elevated as necessary, thereby causing interfacial polymerization at the oily droplet interface, so that particles can be formed. In addition, desolvation can be performed at the same time as, or after the end of, the interfacial polymerization reaction. After the interfacial polymerization reaction and desolvation, the particles are separated from the aqueous phase, washed and then dried to obtain capsule particles.

Furthermore, the epoxy resin used in the formation of the shell layer is formed by reacting with a curing agent such as the amine component or the like, and can be formed using each of the microencapsulation methods described above, for example, by interfacial polymerization.

Usable epoxy resins are epoxy resins having two or more epoxy groups in one molecule, which are commonly used without being limited in molecular weight, molecular structure, or the like, and examples thereof include aromatic epoxy resins such as bisphenol A epoxy resins such as bisphenol A diglycidyl ether epoxy resin, bisphenol F epoxy resins, novolac epoxy resins, cresol novolac epoxy resins, and biphenyl epoxy resins; polyfunctional naphthalene epoxy resins; glycidyl ether epoxy resins of polycarboxylic acids; glycidyl ester epoxy resins of the same; alicyclic epoxy resins obtained by epoxidation of cyclohexane derivatives such as cyclohexane polyether epoxy resin and hydrogenated bisphenol A epoxy resin; and alicyclic epoxy resins such as dicyclopentadiene epoxy resins. Such epoxy resins can be used alone, or two or more thereof can be mixed for use.

In the present invention, the shell layer is formed by each of the forming means described above, so that a microcapsule pigment which contains, at least, the pigment and the medium of the fatty acid polyol ester is obtained.

In the present invention, each content of at least the pigment and the medium of the fatty acid polyol ester may vary, for example, in order to optionally control the dispersibility, specific gravity, and particle diameter, and also to highly attain the stability of the ink. The content of the pigment is preferably 5 to 50% by mass, and the content of the fatty acid polyol ester is preferably 5 to 70% by mass based on the total amount of the microcapsule components (pigment+fatty acid polyol ester+polymer component forming the shell layer; the same applies thereinafter).

The respective content ranges described above can be attained, for example, by adjusting the contents of the materials used during microencapsulation (shell layer-forming material component, pigment, fatty acid polyol, and so on) within suitable ranges and polymerizing the materials.

In a case where the content of the fatty acid polyol ester used is less than 5% by mass, the effect of stability of ink flow during writing may not be obtained. On the other hand, when the content of the fatty acid polyol ester used exceeds 70% by mass, the polymer component that forms the shell layer may be relatively reduced, leading to the formation of an unstable microcapsule. Thus, such contents are not preferable.

The content of the pigment is more preferably 10 to 35% by mass based on the total amount of the microcapsule components, for example, from the viewpoint of optionally and favorably controlling the dispersibility, specific gravity, and particle diameter. Furthermore, the content of the fatty acid polyol ester is more preferably 10 to 60% by mass, particularly preferably, 20 to 50% by mass, based on the total amount of the microcapsule pigment.

In the present invention, the microcapsule pigment which contains, at least, the pigment and the fatty acid polyol ester can be adjusted so that the average particle diameter is 0.1 to 100 μm, for each application of the microcapsule pigment (for ballpoint pens, marking pens, and so on), and, preferably, the range from 0.5 to 20 μm satisfies the practical utility in each of the above-mentioned applications. Note that, in the present invention (including the Examples which will be described below), the "average particle diameter" is a value of D50 calculated, using a refractive index of 1.81, on a volume basis, with a particle diameter distribution analyzer HR9320-X100 (manufactured by Nikkiso Co., Ltd.).

Furthermore, depending on the purpose, the surface of the microcapsule can be further provided with a secondary resin film in order to impart durability, or modified in characteristics and subjected to practical use.

<Aqueous Ink Composition for Writing Instrument>

The aqueous ink composition for a writing instrument according to the present invention includes a microcapsule pigment which includes inside, at least, the pigment and the medium of the fatty acid polyol ester, and is used as an ink composition for a writing instrument such as an aqueous ink ballpoint pen or a marking pen.

In the present invention, the content of the microcapsule pigment having the above-mentioned characteristics is preferably 5 to 50% by mass, further preferably 5 to 30% by mass, based on the total amount of the aqueous ink composition for a writing instrument.

When the content of the microcapsule pigment is less than 5% by mass, the effects specific to the microcapsule pigment having the above-mentioned characteristics may not be exerted. On the other hand, when the content of the microcapsule pigment exceeds 50% by mass, the viscosity may increase, thereby reducing the fluidity of the ink in some cases. Thus, such contents are not preferable.

In addition to the microcapsule pigment having the above-mentioned characteristics, the aqueous ink composition for a writing instrument according to the present invention contains, at least, a general-purpose colorant other than the microcapsule pigment having the above-mentioned characteristics, and a water-soluble solvent.

As the colorant, for example, a water-soluble dye, a pigment (within a range in which the effects of the present invention would not be impaired) such as an inorganic pigment, an organic pigment, a plastic pigment, hollow resin particles having voids within the particles (used as a white pigment) or resin particles (pseudo-pigment) dyed with a basic dye having excellent color development and dispersibility, or the like can be used in an appropriate amount.

As the water-soluble dye, a direct dye, an acid dye, an edible dye, or a basic dye can be used in an appropriate amount within a range in which the effects of the present invention would not be impaired.

Examples of the water-soluble solvent that can be used include glycols such as ethylene glycol, diethylene glycol, triethylene glycol, propylene glycol, polyethylene glycol, 3-butylene glycol, thiodiethylene glycol, and glycerin; ethylene glycol monomethyl ether, and diethylene glycol monomethyl ether. Such solvents may be used alone or as a mixture. The content of the water-soluble solvent is preferably 5 to 40% by mass based on the total amount of the aqueous ink composition for a writing instrument.

In addition to the microcapsule pigment having the above-mentioned characteristics, the colorant other than the microcapsule pigment, and the water-soluble solvent, the aqueous ink composition for a writing instrument according to the present invention may appropriately contain, as the balance, water as a solvent (tap water, purified water, distilled water, ion exchanged water, purified water, or the like) as well as a dispersant, a lubricant, a pH modifier, a corrosion inhibitor, a preservative or an antibacterial agent, a thickener, or the like, within a range in which the effects of the present invention would not be impaired.

Examples of the dispersant that can be used include nonionic and anionic surfactants, and water-soluble resins. Preferably, water-soluble polymers are used.

Examples of the lubricant include, but are not limited to, non-ionic types such as fatty acid esters of polyols, higher fatty acid esters of sugars, polyoxyalkylene higher fatty acid esters, and alkyl phosphate esters; anionic types such as alkyl sulfonates of higher fatty acid amides and alkyl allyl sulfonates; derivatives of polyalkylene glycols, fluorochemical surfactants, and polyether modified silicones, which are also used as surface treating agents for pigments.

Examples of the pH modifier include ammonia, urea, monoethanolamine, diethanolamine, triethanolamine, alkali metal salts of carbonic acid and phosphoric acid such as sodium tripolyphosphate and sodium carbonate, and alkali metal hydroxides such as sodium hydroxide. Examples of the corrosion inhibitor include benzotriazole, tolyltriazole, dicyclohexylammonium nitrite, and saponins. Examples of the preservative or antibacterial agent include phenol, omadine sodium, sodium benzoate, and benzimidazole compounds.

Examples of the thickener include carboxymethylcellulose (CMC) or salts thereof, fermented cellulose, crystalline cellulose, and polysaccharides. Examples of the polysaccharides that can be used include xanthan gum, guar gum, hydroxypropylated guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigeran, hyaluronic acid, pustulan, furoran, HM pectin, porphyran, laminaran, lichenan, carrageenan, alginic acid, tragacanth gum, alkasy gum, succinoglycan, locust bean gum, and tara gum. These polysaccharides may be used alone, or two or more thereof may be used in combination. Commercially available products of these polysaccharides, if present, can be used.

The aqueous ink composition for a writing instrument according to the present invention may be prepared by appropriately combining the microcapsule pigment having the above-mentioned characteristics, a water-soluble solvent, and other components depending on the application of ink for writing instruments (for ballpoint pens, marking pens, etc.), and then mixing components by stirring using a stirrer such as a homomixer, a homogenizer or a disperser, in combination as appropriate, and if necessary, further filtering or centrifuging the mixture to remove coarse particles in the ink composition.

An aqueous ink ballpoint pen can be made by filling, with the aqueous ink composition for a writing instrument, an aqueous ink ballpoint pen body including a ball having a diameter of 0.18 to 2.0 mm.

The aqueous ink ballpoint pen body to be used is not particularly limited, so long as the pen body is provided with a ball having a diameter within the range described above. In particular, desired is an aqueous ink ballpoint pen body finished into a refill aqueous ink ballpoint pen including a stainless steel tip (ball is made of superalloy) at the tip thereof, in which an ink storage tube composed of a polypropylene tube is filled with the aqueous ink composition.

In addition, a pH (25° C.) of the aqueous ink composition for a writing instrument according to the present invention is preferably adjusted to 5 to 10, further preferably 6 to 9.5 by using a pH modifier or the like from the viewpoint of usability, safety, stability of the ink itself, and matching with the ink container.

The aqueous ink composition for a writing instrument according to the present invention is loaded in a ballpoint pen, a marking pen, or the like provided with a pen tip such as a ballpoint pen tip, a fiber tip, a felt tip, a plastic tip, a fiber feeder, or a porous feeder.

The ballpoint pen in the present invention includes an instrument where the aqueous ink composition for a writing instrument having the above-mentioned composition is accommodated in an ink container (refill) for a ballpoint pen, and where a material which is not compatible with the aqueous ink composition accommodated in the ink container and which has a small specific gravity with respect to the aqueous ink composition, for example, polybutene, silicone oil, and mineral oil is accommodated as an ink follower.

Note that the structures of the ballpoint pen and the marking pen are not particularly limited, and the ballpoint pen and the marking pen may be, for example, a direct liquid type pen provided with a collector structure (ink holding mechanism) using a barrel itself as an ink container in which the barrel is filled with the aqueous ink composition for a writing instrument having the configuration described above.

In the thus-configured aqueous ink composition for a writing instrument according to the present invention, the microcapsule pigment having the above-mentioned characteristics is blended. Therefore, as compared with a microcapsule pigment formed by microencapsulating only a pigment having a high specific gravity such as titanium oxide or zinc oxide or a pigment having a somewhat less dispersibility such as carbon black, the microcapsule pigment is improved in dispersion stability in the vicinity of the ball by the action of the fatty acid polyol ester, without impairment in dispersibility, and thus aggregation of a microcapsule pigment and clogging due to such aggregation are suppressed, so that excellent stability of ink flow and the like can be obtained.

Also, the microcapsule pigment included in the obtained aqueous ink composition for a writing instrument can be optionally controlled in terms of the specific gravity and particle diameter. Accordingly, in the present invention, the microcapsule pigment can be suitably used as a colorant in the aqueous ink composition for a writing instrument. Therefore, the target aqueous ink composition for a writing instrument can be formed, for example, by suitably combining the respective components for ballpoint pens, marking pens, and so on.

EXAMPLES

Next, the present invention will be described in more detail with respect to Production Examples, Examples and Comparative Examples, but the present invention is not limited to the following Examples. Note that the unit "part" in the following Production Examples means "part by mass".

Production Example 1: Particles 1

As an oil phase solution, while 17 parts of triethylene glycol distearate (ESTEPEARL 30, melting point: 44 to 51° C., manufactured by Nikko Chemicals Co., Ltd.) was warmed to 65° C., 4 parts of titanium oxide (CR-93, manufactured by Ishihara Sangyo Kaisha, Ltd.) was added thereto and dispersed well. Next, 4 parts of methyl ethyl ketone was added, and 7 parts of a trimethylolpropane-modified product of xylylene diisocyanate (D-110N, manufactured by Mitsui Chemicals, Inc.) were further added. The solution was stirred at 65° C.

As an aqueous phase solution, 15 parts of polyvinyl alcohol (PVA-205, manufactured by Kuraray Co., Ltd.) was dissolved in 600 parts of distilled water warmed to 65° C., and the above-mentioned oil phase solution was added to this solution, and 6 parts of hexamethylene diamine was further added. The solution mixture was subjected to emulsification and mixing to complete polymerization.

The formed dispersion was centrifuged to recover microcapsules, thereby obtaining microcapsule pigments (Particles 1). The average particle diameter of Production Example 1 (Particles 1) was 3.0 μm.

Production Example 2: Particles 2

Microcapsule pigments (Particles 2) were obtained in the same manner as in Production Example 1 described above, except that the triethylene glycol distearate of Production Example 1 was replaced with the same amount of ethylene glycol distearate (ESTEPEARL 10V, melting point: 58 to 65° C., manufactured by Nikko Chemicals Co., Ltd.). The average particle diameter of Production Example 2 (Particles 2) was 2.8 μm.

Production Example 3: Particles 3

Microcapsule pigments (Particles 3) were obtained in the same manner as in Production Example 1 described above, except that the triethylene glycol distearate of Production Example 1 was replaced with the same amount of glycerin monostearate (RHEODOL MS-50, melting point: 55 to 65° C., manufactured by Kao Corporation). The average particle diameter of Production Example 3 (Particles 3) was 3.2 μm.

Production Example 4: Particles 4

Microcapsule pigments (Particles 4) were obtained in the same manner as in Production Example 1 described above, except that the triethylene glycol distearate of Production Example 1 was replaced with the same amount of sorbitan monopalmitate (RHEODOL SP-P10, melting point: 46° C., manufactured by Kao Corporation). The average particle diameter of Production Example 4 (Particles 4) was 3.1 μm.

Production Example 5: Particles 5

Microcapsule pigments (Particles 5) were obtained in the same manner as in Production Example 1 described above, except that the triethylene glycol distearate of Production Example 1 was replaced with the same amount of propylene glycol monobehenate (RIKEMAL PB-100, melting point: 54 to 60° C., manufactured by Riken Vitamin Co., Ltd.). The average particle diameter of Production Example 5 (Particles 5) was 2.9 μm.

Production Example 6: Particles 6

As an oil phase solution, while 17 parts of triethylene glycol distearate (ESTEPEARL 30, melting point: 44 to 51° C., manufactured by Nikko Chemicals Co., Ltd.) was warmed to 80° C., 4 parts of carbon black (MA100, manufactured by Mitsubishi Chemical Corporation) was added thereto and dispersed well. Next, 4 parts of methyl ethyl ketone and further 9 parts of a trimethylolpropane-modified product of xylylene diisocyanate (D-110 N, manufactured by Mitsui Chemicals, Inc.) were further added and stirred at 65° C.

As an aqueous phase solution, 15 parts of polyvinyl alcohol (PVA-205, manufactured by Kuraray Co., Ltd.) was dissolved in 600 parts of distilled water warmed to 65° C., and the above-mentioned oil phase solution was added to this solution, and 6 parts of hexamethylene diamine was further added. The solution mixture was subjected to emulsification and mixing to complete polymerization.

The formed dispersion was centrifuged to recover microcapsules, thereby obtaining microcapsule pigments (Particles 6). The average particle diameter of Production Example 6 (Particles 6) was 3.1 μm.

Production Example 7: Particles 7

Microcapsule pigments (Particles 7) were obtained in the same manner as in Production Example 1, except that the triethylene glycol distearate of Production Example 1 was replaced with the same amount of sorbitan monostearate (RHEODOL TW-S106V, melting point: 38° C., manufactured by Kao Corporation). The average particle diameter of Production Example 7 (Particles 7) was 3.0 μm.

Production Example 8: Particles 8

Microcapsule pigments (Particles 8) were obtained in the same manner as in Production Example 1 described above, except that the triethylene glycol distearate of Production Example 1 was replaced with the same amount of propylene glycol monopalmitate (RIKEMAL PP-100, melting point: 30 to 36° C., manufactured by Riken Vitamin Co., Ltd.). The average particle diameter of Production Example 8 (Particles 8) was 2.8 μm.

Production Example 9: Particles 9

Microcapsule pigments (Particles 9) were obtained in the same manner as in Production Example 1, except that the triethylene glycol distearate of Production Example 1 was replaced with the same amount of myristyl stearate. The average particle diameter of Production Example 9 (Particles 9) was 3.0 μm.

Production Example 10: Particles 10

Microcapsule pigments (Particles 10) were obtained in the same manner as in Production Example 1, except that the triethylene glycol distearate of Production Example 1 was replaced with the same amount of myristyl myristate. The average particle diameter of Production Example 10 (Particles 10) was 3.1 μm.

Examples 1 to 8 and Comparative Examples 1 and 2

Using the microcapsule pigments (Particles 1 to 10) of Production Examples 1 to 10 obtained above, the aqueous ink compositions for a writing instrument were prepared by an ordinary method according to the formulations shown in Table 1. The pHs of the aqueous ink compositions for a writing instrument at room temperature (25° C.), when measured with a pH meter (manufactured by HORIBA, Ltd.), was within the range from 7.9 to 8.2.

Aqueous ink ballpoint pens were made by the following method for the aqueous ink compositions for a writing instrument obtained above, and the stability of ink flow was evaluated by the following evaluation method.

These results are shown in Table 1 below.
(Making of Aqueous Ink Ballpoint Pen)

Aqueous ink ballpoint pens were made using each of the ink compositions obtained above. Specifically, using a holder of a ballpoint pen (SIGNO UM-151, manufactured by Mitsubishi Pencil Co., Ltd.), a refill including an ink storage tube made of polypropylene having an inner diameter of 4.0 mm and a length of 113 mm, a stainless steel tip (cemented carbide ball, ball diameter: 0.38 mm) and a joint connecting the storage tube and the tip was filled with the aqueous inks described above, and an ink follower composed mainly of a mineral oil was provided at the rear end of the ink, thus making an aqueous ink ballpoint pen.
(Method for Evaluating Stability of Ink Flow)

The aqueous ink ballpoint pen having the configuration described above was filled with the obtained aqueous ink compositions for a writing instrument of Examples 1 to 8 and Comparative Examples 1 and 2, and writability tests in accordance with JIS S6061 (2010) were conducted to determine an ink flow rate (X) in 0 to 100 m and an ink flow rate (Y) in 400 to 500 m. The stability of ink flow was evaluated based on the following evaluation criteria.
Evaluation Criteria:
 A: Y/X=0.9 or more and 1.1 or less
 B: Y/X=0.8 or more and less than 0.9, or more than 1.1 and 1.2 or less
 C: Y/X=less than 0.8 or more than 1.2

TABLE 1

(Total 100% by mass)

|  |  |  | Examples | | | | | |
|---|---|---|---|---|---|---|---|---|
|  |  |  | 1 | 2 | 3 | 4 | 5 | 6 |
| Microcapsule Pigment | Particle 1 |  | 15 |  |  |  |  |  |
|  | Particle 2 |  |  | 15 |  |  |  |  |
|  | Particle 3 |  |  |  | 15 |  |  |  |
|  | Particle 4 |  |  |  |  | 15 |  |  |
|  | Particle 5 |  |  |  |  |  | 15 |  |
|  | Particle 6 |  |  |  |  |  |  | 15 |
|  | Particle 7 |  |  |  |  |  |  |  |
|  | Particle 8 |  |  |  |  |  |  |  |
|  | Particle 9 |  |  |  |  |  |  |  |
|  | Particle 10 |  |  |  |  |  |  |  |
| Amines | Triethanol amine |  | 0.1 | 0.1 | 0.1 | 0.1 | 0.1 | 0.1 |
| Thickener | Xanthan gum | *1 | 0.3 | 0.3 | 0.3 | 0.3 | 0.3 | 0.3 |
| Corrosion Inhibitor | Benzotriazole |  | 0.3 | 0.3 | 0.3 | 0.3 | 0.3 | 0.3 |
| Preservative | Benzoisothiazoline | *2 | 0.3 | 0.3 | 0.3 | 0.3 | 0.3 | 0.3 |
| Lubricant | Phosphate ester | *3 | 0.3 | 0.3 | 0.3 | 0.3 | 0.3 | 0.3 |
| Solvent | Glycerin |  | 10 | 10 | 10 | 10 | 10 | 10 |
| Water | Purified water |  | 73.7 | 73.7 | 73.7 | 73.7 | 73.7 | 73.7 |
| Stability of ink flow |  |  | A | A | A | A | A | A |

|  |  |  | Examples | | Comparative Examples | |
|---|---|---|---|---|---|---|
|  |  |  | 7 | 8 | 1 | 2 |
| Microcapsule Pigment | Particle 1 |  |  |  |  |  |
|  | Particle 2 |  |  |  |  |  |
|  | Particle 3 |  |  |  |  |  |
|  | Particle 4 |  |  |  |  |  |
|  | Particle 5 |  |  |  |  |  |
|  | Particle 6 |  |  |  |  |  |
|  | Particle 7 |  | 15 |  |  |  |
|  | Particle 8 |  |  | 15 |  |  |
|  | Particle 9 |  |  |  | 15 |  |
|  | Particle 10 |  |  |  |  | 15 |
| Amines | Triethanol amine |  | 0.1 | 0.1 | 0.1 | 0.1 |
| Thickener | Xanthan gum | *1 | 0.3 | 0.3 | 0.3 | 0.3 |
| Corrosion Inhibitor | Benzotriazole |  | 0.3 | 0.3 | 0.3 | 0.3 |
| Preservative | Benzoisothiazoline | *2 | 0.3 | 0.3 | 0.3 | 0.3 |
| Lubricant | Phosphate ester | *3 | 0.3 | 0.3 | 0.3 | 0.3 |
| Solvent | Glycerin |  | 10 | 10 | 10 | 10 |
| Water | Purified water |  | 73.7 | 73.7 | 73.7 | 73.7 |
| Stability of ink flow |  |  | B | B | C | C |

*1: KELZAN S (manufactured by Sansho Co., Ltd.)
*2: Bioden 421 (manufactured by Daiwa Chemical Industries Co., Ltd.)
*3: RD-510Y (TOHO Chemical Industry Co., Ltd.)

As is clear from the results in Table 1 given above, it was found that the aqueous ink compositions for a writing instrument using the microcapsule pigments of Examples 1 to 8 which are according to the present invention have excellent stability of ink flow as compared with the aqueous ink compositions for a writing instrument using the microcapsule pigments of Comparative Examples 1 and 2 which are out of the scope of the present invention.

INDUSTRIAL APPLICABILITY

The aqueous ink compositions for a writing instrument according to the present invention can be suitably used as aqueous ink compositions for writing instruments such as ballpoint pens, marking pens, and the like.

The invention claimed is:

1. An aqueous ink composition for a ballpoint pen, including inside a microcapsule pigment including, at least, a pigment and a medium of a fatty acid polyol ester, wherein the fatty acid polyol ester is an ester constituted of a fatty acid and a polyol selected from the group consisting of ethylene glycol, diethylene glycol, triethylene glycol, polyethylene glycol, propylene glycol, dipropylene glycol, glycerin, sorbitan, sorbitol, pentaerythritol, dipentaerythritol, and trimethylolpropane, and
wherein a melting point of the fatty acid polyol ester is 40° C. or higher and 70° C. or lower.

2. The aqueous ink composition for a ballpoint pen described in claim 1, wherein a shell component forming microcapsules is urethane, urea, or urea-urethane.

3. The aqueous ink composition for a ballpoint pen described in claim 1, wherein a content of the fatty acid polyol ester is 5 to 70% by mass based on a total amount of microcapsule components.

4. The aqueous ink composition for a ballpoint pen described in claim 1, wherein the pigment is an inorganic pigment.

5. The aqueous ink composition for a ballpoint pen described in claim 1, wherein the pigment is titanium oxide or carbon black.

\* \* \* \* \*